(12) United States Patent
Aldousari et al.

(10) Patent No.: US 10,427,378 B2
(45) Date of Patent: *Oct. 1, 2019

(54) COMPOSITE EPOXY MATERIAL WITH EMBEDDED SILICON CARBIDE AND ALUMINA NANOPARTICLES

(71) Applicant: King Abdulaziz University, Jeddah (SA)

(72) Inventors: Saad M. Aldousari, Jeddah (SA); Hassan S. Hedia, Jeddah (SA); Usama A. Khashaba, Jeddah (SA); Mostafa A. Hamed, Jeddah (SA)

(73) Assignee: King Abdulaziz University, Jeddah (SA)

( * ) Notice: Subject to any disclaimer, the term of this patent is extended or adjusted under 35 U.S.C. 154(b) by 0 days.

This patent is subject to a terminal disclaimer.

(21) Appl. No.: 15/147,390

(22) Filed: May 5, 2016

(65) Prior Publication Data

US 2017/0120566 A1    May 4, 2017

Related U.S. Application Data

(60) Provisional application No. 62/248,005, filed on Oct. 29, 2015.

(51) Int. Cl.
*B32B 17/04*        (2006.01)
*B32B 5/28*        (2006.01)
(Continued)

(52) U.S. Cl.
CPC .......... *B32B 5/26* (2013.01); *B32B 1/00* (2013.01); *B32B 5/12* (2013.01); *B32B 5/16* (2013.01);
(Continued)

(58) Field of Classification Search
CPC .............. C08J 5/005; Y10T 428/24994; Y10T 428/249942–428/249946;
(Continued)

(56) References Cited

U.S. PATENT DOCUMENTS 5,128,199 A * 7/1992 Iyer ........................... B05C 9/14
428/112
2008/0286564 A1* 11/2008 Tsotsis .................. B29C 70/025
428/332

(Continued)

FOREIGN PATENT DOCUMENTS

CN        102504204 B      8/2013
CN        102451615 B      11/2013

OTHER PUBLICATIONS

Alnefaie et al., "New development of self-damping MWCNT composites," Composites: Part A, vol. 52, 2013, p. 1-11.*
(Continued)

*Primary Examiner* — Z. Jim Yang
(74) *Attorney, Agent, or Firm* — Oblon, McClelland, Maier & Neustadt, L.L.P.

(57) ABSTRACT

A stacked composite material and a method of preparation, wherein the stacked composite materials comprises of glass fiber layers sandwiched between nanocomposite layers. The nanocomposite layers comprise a nanofiller dispersed in a cured epoxy matrix, wherein the nanofiller is at least one of silicon carbide nanoparticles or aluminum oxide nanoparticles. Adjacent and noncontiguous glass fiber layers are oriented in a unidirectional orientation or a quasi-isotropic orientation.

20 Claims, 10 Drawing Sheets

(51) Int. Cl.
| | |
|---|---|
| *B32B 5/26* | (2006.01) |
| *B32B 27/20* | (2006.01) |
| *B32B 5/12* | (2006.01) |
| *B32B 27/38* | (2006.01) |
| *B32B 27/12* | (2006.01) |
| *C08J 5/00* | (2006.01) |
| *B32B 5/30* | (2006.01) |
| *B32B 5/16* | (2006.01) |
| *B32B 1/00* | (2006.01) |
| *B32B 37/24* | (2006.01) |

(52) U.S. Cl.
CPC ............... *B32B 5/28* (2013.01); *B32B 5/30* (2013.01); *B32B 27/12* (2013.01); *B32B 27/20* (2013.01); *B32B 27/38* (2013.01); *C08J 5/005* (2013.01); *B32B 2037/243* (2013.01); *B32B 2250/05* (2013.01); *B32B 2250/20* (2013.01); *B32B 2255/02* (2013.01); *B32B 2255/26* (2013.01); *B32B 2260/023* (2013.01); *B32B 2260/046* (2013.01); *B32B 2262/0269* (2013.01); *B32B 2262/062* (2013.01); *B32B 2262/101* (2013.01); *B32B 2262/106* (2013.01); *B32B 2262/14* (2013.01); *B32B 2264/102* (2013.01); *B32B 2264/107* (2013.01); *B32B 2264/12* (2013.01); *B32B 2307/204* (2013.01); *B32B 2307/206* (2013.01); *B32B 2307/302* (2013.01); *B32B 2307/50* (2013.01); *B32B 2307/516* (2013.01); *B32B 2307/536* (2013.01); *B32B 2307/54* (2013.01); *B32B 2307/552* (2013.01); *B32B 2307/554* (2013.01); *B32B 2307/58* (2013.01); *B32B 2307/704* (2013.01); *B32B 2307/708* (2013.01); *B32B 2307/714* (2013.01); *B32B 2307/72* (2013.01); *B32B 2307/732* (2013.01); *B32B 2363/00* (2013.01)

(58) Field of Classification Search
CPC ... Y10T 428/249948; Y10T 428/24995; Y10T 428/249952; B32B 5/10; B32B 5/12; B32B 5/16; B32B 5/26; B32B 5/28; B32B 5/30; B32B 17/02; B32B 17/04; B32B 17/067; B29C 70/02; B29C 70/021; B29C 70/025; B29C 70/06; B29C 70/10; B29C 70/16; B29C 70/20–70/24
See application file for complete search history.

(56) References Cited

U.S. PATENT DOCUMENTS

| | | | | |
|---|---|---|---|---|
| 2009/0117363 A1* | 5/2009 | Wardle | ............... | B29C 66/721 428/223 |
| 2010/0215887 A1* | 8/2010 | Kawabe | ............... | B29C 43/146 428/56 |
| 2011/0064908 A1* | 3/2011 | Kweder | ............... | B29B 11/16 428/113 |
| 2011/0174522 A1* | 7/2011 | Simmons | ............... | B32B 5/26 174/122 R |
| 2012/0177872 A1* | 7/2012 | Tsai | ............... | B29C 70/202 428/113 |
| 2013/0029089 A1* | 1/2013 | Kia | ............... | B29C 70/025 428/119 |
| 2013/0034447 A1* | 2/2013 | Nordin | ............... | B29C 70/081 416/230 |
| 2013/0034724 A1* | 2/2013 | Sodano | ............... | B32B 7/04 428/325 |
| 2013/0200309 A1* | 8/2013 | Song | ............... | B29C 70/025 252/502 |
| 2014/0023513 A1* | 1/2014 | Johnson | ............... | F03D 1/0675 416/230 |
| 2014/0154456 A1* | 6/2014 | Liou | ............... | B32B 5/26 428/76 |
| 2014/0170408 A1* | 6/2014 | Frulloni | ............... | B32B 5/28 428/301.4 |
| 2015/0140885 A1* | 5/2015 | Eder | ............... | D03D 15/0011 442/136 |
| 2015/0166743 A1* | 6/2015 | Restuccia | ............... | C08J 5/10 428/327 |
| 2015/0218337 A1* | 8/2015 | Studart | ............... | B82Y 30/00 428/215 |
| 2015/0246505 A1* | 9/2015 | Yasue | ............... | B29C 70/24 428/102 |
| 2015/0283788 A1* | 10/2015 | Tsotsis | ............... | B32B 27/18 442/393 |
| 2015/0344666 A1* | 12/2015 | Macosko et al. | ............... | B32B 27/08 442/294 |
| 2016/0023429 A1* | 1/2016 | Voleti | ............... | B32B 5/12 428/113 |
| 2016/0039185 A1* | 2/2016 | Kawabe | ............... | C08J 5/24 428/335 |
| 2016/0089863 A1* | 3/2016 | Fetfatsidis | ............... | H05B 3/06 428/688 |
| 2016/0114500 A1* | 4/2016 | Grodnensky | ............... | B29C 70/025 156/181 |
| 2016/0159998 A1* | 6/2016 | Spencer | ............... | B29C 70/547 156/286 |
| 2016/0257104 A1* | 9/2016 | Wilenski | ............... | B32B 5/00 |
| 2016/0340482 A1* | 11/2016 | Williams | ............... | C04B 35/83 |
| 2017/0129207 A1* | 5/2017 | Hallander | ............... | B29C 70/08 |
| 2018/0023220 A1* | 1/2018 | Hata | ............... | C08K 3/041 423/447.1 |
| 2018/0265217 A1* | 9/2018 | Ballocchi | ............... | C08J 5/005 |

OTHER PUBLICATIONS

Tang et al., Interlaminar fracture toughness and CAI strength of fibre-reinforced composites with nanoparticles—A review; Composite Science and Technology, vol. 86, 2013, 26-37.*
Asi, O; Mechanical Properties of Glass-Fiber Reinforced Epoxy Composites Filled with Al2O3 Particles; Journal of Reinforced Plastics and Composites, vol. 28, p. 2861-2867; 2009.*
Akinyeded, O; Static and Fatigue Behavior of Epoxy/Fiberglass Composites Hybridized with Alumina Nanoparticles; Journal of Reinforced Plastics and Composites, vol. 43; p. 769; 2009.*
Jin et al.; Thermal properties of epoxy resin/filler hybrid composites; Polymer Degradation and Stability, vol. 97, 2012, p. 2148-2153.*
Jiang et al., Thermo-mechanical behaviors of epoxy resins reinforced with nano-Al2O3 particles; Journal of Industrial and Engineering Chemistry, vol. 18, 2012, p. 594-596.*
Sayer, M; Elastic properties and buckling load evaluation of ceramic particles filled glass/epoxy composites; Composites: Part B; vol. 59, 2014, p. 12-20.*
Zhang et al, The Effects of Alumina Nanofillers on Mechanical Properties of High-Performance Epoxy Resin, 2010, J. Nanosci. Nanotechnol., vol. 10, No. 11, p. 7526. (Year: 2010).*
Wetzel et al, Epoxy Nanocomposites—Fracture and Toughening Mechanisms, 2006, Engineering Fracture Mechanics, vol. 73, p. 2375. (Year: 2006).*
Devendra, K., et al., "Evaluation of Thermal Properties of E-Glass/Epoxy Composites Filled by Different Filler Materials", International Journal of Computational Engineering Research (ijceronline.com), vol. 2, Issue 5, pp. 1708-1714, (Sep. 2012).
Arpitha, G.R., et al., "Mechanical Properties of Epoxy Based Hybrid Composites Reinforced with Sisal/SIC/Glass Fibers", International Journal of Engineering Research and General Science, vol. 2, Issue 5, (Aug-Sep. 2014).
Dagar, V., "Glass Fiber Reinforced Nanocomposites—Effects of Fiber Orientation and Nanoclay Content", URL: http://dspace.thapar.

(56) References Cited

OTHER PUBLICATIONS edu:8080/dspace/bitstream/10266/2177/1/VIKAS+THESIS-+FINAL+with+scan+cert..pdf, Total 59 Pages, (2013).

* cited by examiner

COMPOSITE EPOXY MATERIAL WITH EMBEDDED SILICON CARBIDE AND ALUMINA NANOPARTICLES

CROSS REFERENCE TO RELATED APPLICATIONS

This application claims the benefit of U.S. Provisional Application No. 62/248,005 filed Oct. 29, 2015.

BACKGROUND OF THE INVENTION

Technical Field

The present invention relates to a composite and a method of manufacturing a composite epoxy material with embedded silicon carbide and alumina nanoparticles.

Description of the Related Art

The "background" description provided herein is for the purpose of gene all presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Polymer based composites reinforced with a small percentage of strong fillers were shown to significantly improve the thermal, mechanical and barrier properties of the pure polymer matrix. See N. Chisholm, H. Mahfuz, V. K. Rangari, A. Ashfaq, S. Jeelani: Fabrication and mechanical characterization of carbon/SiC epoxy nanocomposites, Composite Structures 67 (2005), pp. 115-124, incorporated herein by reference in its entirety. Moreover, improvements were achieved by conventional processing techniques without any detrimental effects on appearance, processing, density and ageing performance of the matrix. Eventually, these composites were considered for a wide range of applications including coating, packaging, electronics, automotive and aerospace industries. While nanoparticles have attractive attributes, they are rarely used in structural composites which have relatively large dimensions. Recently, nanofillers were used to modify different types of epoxy resin. See K. Tao, S. Yang, J. C. Grunlan, Y. S. Kim, B. Dang, Y. Deng, R. L. Thomas, B. L. Wilson, X. Wei: Effects of Carbon Nanotube Fillers on the Curing Processes of Epoxy Resin-Based Composites, J. Applied Polymer Science 102 (2006), pp. 5248-5254; M. A. Megahed, A. A. Megahed, H. E. M. Sallam, U. A. Khashaba, M. A. Seif, M. Abd Elhamid: Nano-Reinforcement Effects on Tensile Properties of Epoxy Resin, Proc. of the Int. Conf. MEATIP5, Assiut University, Egypt (2011), pp. 123-135; X. Zhou, E. Shin, K. W. Wang, C. E. Bakis: Interfacial damping characteristics of carbon nanotube-based composites, Composites Science and Technology 64 (2004), pp. 2425-2437; S. Bal: Experimental study of mechanical and electrical properties of carbon nanofiber/epoxy composites, Materials and Design 31 (2010), pp. 2406-2413; N. Hu, Y. Li, T. Nakamura, T. Katsumata, T. Koshikawa, M. Arai: Reinforcement effects of MWCNT and VGCF in bulk composites and interlayer of CFRP laminates, Composites Part B 43 (2012), pp. 3-9; S. U. Khan, C. Y. Li, N. A. Siddiqui, J. K. Kim: Vibration damping characteristics of carbon fiber-reinforced composites containing multi walled carbon nanotubes, Composites Science and Technology 71 (2011), pp. 1486-149; Zhou, F. Pervin, S. Jeelani, P. K. Mallick: Improvement in mechanical properties of carbon fabric-epoxy composite using carbon nanofibers, J. Materials Processing Technology 198 (2008), pp. 445-453; P. R. Mantena, A. Al-Ostaz, A. H. D. Cheng: Dynamic response and simulations of nanoparticle-enhanced composites, Composites Science and Technology 69 (2009), pp. 772-779; M. R. Ayatollahi, S. Shadlou, M. M. Shokrieh: Fracture toughness of epoxy/multi-walled carbon nanotube nano-composites under bending and shear loading conditions, Materials and Design 32 (2011), pp. 2115-2124; L. Sun, G. L. Warren, Y. O'Reilly, W. N. Everett, S. M. Lee, D. Davis, D. Lagoudas, H. J. Sue: Mechanical properties of surface-functionalized SWCNT/epoxy composites, Carbon (2008), pp. 320-328; R. F. Gibson, E O. Ayorinde, Y. F. Wen: Vibrations of carbon nanotubes and their composites: A review, Composites Science and Technology 67 (2007), pp. 1-28; D. Qian, C. Dickey, R. Andrews, T. Rantell: Load transfer and deformation mechanism in carbon nanotube-polystyrene composites, Appl. Phys. Lett. 76 (2000), No. 20, pp. 2868-2870; C. Velasco-Santos, A. L. Martinez-Hernandez, F. Fisher, R. Ruoff, V. M. Castano: Dynamic mechanical and thermal analysis of carbon nanotube-methylethylmethacrylate nanocomposites, J. Phys. D. 36 (January 2003), pp. 1423-1428; Z. L. Jin, S. J. Park: Thermal properties of epoxy resin/filler hybrid composites, Polymer Degradation and Stability 97 (2012), pp. 2148-2153; W. Jiang, F. L. Jin, S. J. Park: Thermo-mechanical behaviors of epoxy resins reinforced with nano-Al2O3 particles, Journal of Industrial and Engineering Chemistry 18 (2012), pp. 594-596; M. S. Goyat, S. Ray, P. K. Ghosh: Innovative application of ultrasonic mixing to produce homogeneously mixed nanoparticulate-epoxy composite of improved physical properties, Composites Part A 42 (2011), pp. 1421-1431; O. Akinyede, R. Mohan, A. Kelkar, J. Sankar: Static and fatigue behavior of epoxy/fiberglass composites hybridized with alumina nanoparticles, J. Composite Materials 43 (2009), pp. 769-781; H. Zhao, R. K. Y. Li: Effect of water absorption on the mechanical and dielectric properties of nano-alumina filled epoxy nanocomposites, Composites Part A 39 (2008), pp. 602-611; C. Ocando, A. Tercjak, I. Mondragon: Nanostructured systems based on SBS epoxidized triblock copolymers and well dispersed alumina/epoxy matrix composites, Composites Science and Technology 70 (2010), pp. 1106-1112; S. H. Lim, K. Y. Zeng, C. B. He: Morphology, tensile and fracture characteristics of epoxyalumina nanocomposites, Materials Science and Engineering A 527 (2010), pp. 5670-5676; D. K. Shukla, S. V. Kasisomayajula, V. Parameswaran: Epoxy composites using functionalized alumina platelets as reinforcements, Composites Science and Technology 68 (2008), pp. 3055-3063; M. F. Uddin, C. T. Sun: Improved dispersion and mechanical properties of hybrid nanocomposites, Composites Science and Technology 70 (2010), pp. 223-230, each incorporated herein by reference in its entirety. Some researchers used the nanophased epoxy to hybridize advanced composite laminates.

Significant effort has been focused on improving epoxy materials using nanofillers. See B. Bittmann, F, Haupert, A. K. Schlarb: Ultrasonic dispersion of inorganic nanoparticles in epoxy resin, Ultrasonics Sonochemistry 16 (2009), pp. 622-628; D. I. Tee, M. Mariatti, A. Azizan, C. H. See, K. F. Chong: Effect of silane-based coupling agent on the properties of silver nanoparticles filled epoxy composites, Composites Science and Technology 67 (2007), pp. 2584-2591; C. Chen, R. S. Justice, D. W. Schaefer, J. W. Baur: Highly dispersed nanosilica epoxy resins with enhanced mechanical properties. Polymer 49 (2008), pp. 3805-3815; H. E. M. Sallam, U. A. Khashaba, M. A. Seif, M. Abd-Elhamid, A. A. Megahed, M. A. Megahed: Ultrasonic mixing of nanoparticles in epoxy resin, Proc. of the Int. Conf. on Nano Technology for Green and Sustainable Construction, Cairo, Egypt (2010), pp. 312-316; N. Lachman, H. D. Wagner:

Correlation between interfacial molecular structure and mechanics in CNT/epoxy nano-composites, Composites Part A 41 (2010), pp. 1093-1098; S. Ganguli, H. Aglan, P. Dennig, G. Irvin: Effect of loading and surface modification of MWCNTs on the fracture behavior of epoxy nanocomposites, Journal of Reinforced Plastics and Composites (2006), pp. 175-188; J. P. Yang, Z. K. Chen, Q. P. Feng, Y. H. Deng, Y. Li, Q. Q. Ni, S. Y. Yu: Cryogenic mechanical behaviors of carbon nanotube reinforced composites based on modified epoxy by poly(ethersulfone), Composites Part B 43 (2012), pp. 22-26; F. Mujika, G. Vargas, J. Ibarretxe, J. De Gracia, A. Arrese: Influence of the modification with MWCNT on the interlaminar fracture properties of long carbon fiber composites, Composites Part B 43 (2012), pp. 1336-1340; V. K. Srivastava: Modeling and mechanical performance of carbon nanotube/epoxy resin composites, Materials and Design 39 (2012), pp. 432-436; M. R. Loos, J. Yang, D. L. Feke, L Manas-Zloczower: Effect of blockcopolymer dispersants on properties of carbon nanotube/ epoxy systems, Composites Science and Technology, 72 (2012), pp. 482-488, each incorporated herein in its entirety. CNT have taken a prominent position for a new generation of high-performance nanocomposites because of their novel structure and several remarkable mechanical, thermal and electrical properties. See H. C. Kim, S. K. Kim, J. T. Kim, K. Y. Rhee, J. Kathi: The Effect of Different Treatment Methods of Multiwalled Carbon Nanotubes on Thermal and Flexural Properties of Their Epoxy Nanocomposites, J. Polymer Science Part B: Polymer Physics 48 (2010), pp. 1175-1184, incorporated herein by reference in its entirety. The aggregated CNTs are in the form of bundles or ropes, usually with highly entangled network structure that is the reason why they are very difficult to disperse. On the other hand, the spherical shape of $Al_2O_3$ and SiC nanoparticles (the aspect ratio is not large as CNTs) may increase their dispersions in epoxy resin. The homogeneous dispersion of nanofillers within the polymer matrix is a prerequisite of any composites and verified remain problems to be solved. See S. Yang, W. Lin, Y. Huang, H. Tien, J. Wang, C. M. Ma, S. Li, Y. Wang: Synergetic effects of graphene platelets and carbon nanotubes on the mechanical and thermal properties of epoxy composites, Carbon 49 (2011), pp. 793-803, incorporated herein by reference in its entirety.

Different techniques have been used to enhance the dispersion of nanofillers in polymer resins, including the use of melt mixing, mechanical shear mixer, sol-gel (modification of the chemical surface of fillers), in situ polymerization, three-roll mill, ball milling and mechanical stirring. According to previous researchers, ultrasonic agitation method is more effective to disperse CNT in epoxy resins. See J. S. Jang, J. Varischetti, G. W. Lee, J. Suhr: Experimental and analytical investigation of mechanical damping and CTE of both SiO2 particle and carbon nanofiber reinforced hybrid epoxy composites, Composites Part A 42 (2011), pp. 98-103; A. Martone, C. Formicola, F. Piscitelli, M. Lavorgna, M. Zarrelli, V. Antonucci, M. Giordano: Thermo-mechanical characterization of epoxy nanocomposites with different carbon nanotube distributions obtained by solvent aided and direct mixing, J. Express Polymer Letters 6 (2012), pp. 520-531, each incorporated herein in its entirety. Currently, high power ultrasonic liquid processors are used to disperse MWCNTs in epoxy resin.

In sonication, the sonication probe generates high-intensity ultrasound waves that penetrate into the liquid filler matrix mixture, where cavitation bubbles can develop and grow during several cycles until they attain a critical diameter, which induces their implosion. This collapse causes extreme local conditions as a very high local pressure and very high temperatures, a so called hot-spot. Due to these hot-spots a splitting up of filler agglomerates can occur. The shock waves from the implosive bubble collapse in combination with micro-streaming generated by cavitation oscillations lead to dispersion effects. If a mixture contains a gas like air, more bubbles will be likely formed during sonication, which can lead to a better dispersion. On the other hand, the entrapped air impairs the flow ability of the mixture. Thus, a positive effect superimposes a negative effect. Sonication parameters can play an important role in enhancement of the dispersion of nanofillers in viscous polymers. These parameters are: sonication power, frequency, amplitude, time, temperature, energy, energy density, dimensions of sonication probe, immersion depth of the sonication probe, and sonication mode (pulsed or continuous). See J. L. Tsai, M. D. Wu: Organoclay effect on mechanical responses of glass/epoxy nanocomposites, Compos. Mater. 6 (2008), pp. 553-568, incorporated herein in its entirety.

The literature on ultrasonic dispersion of nanoparticles in epoxy resin presents varying processing parameters to achieve the dispersion of nanoparticles in epoxy resin. Wide varieties of sonication power were observed by a number of investigators for dispersing nanofillers in epoxy resin: 350 W, 500 W, 600 W, and 750 W. Bittmann et al. found that the dispersion of titanium dioxide nanoparticles in epoxy resin at highest sonication of 100%, and hence the highest power input, leads to the best dispersion result. See S. Zhao, L. S. Schadler, R. Duncan, H. Hillborg, T. Auletta: Mechanisms leading to improved mechanical performance in nanoscale alumina filled epoxy, Composites Science and Technology 68 (2008), pp. 2965-2975, incorporated herein in its entirety. Sonicator probe diameter can play an important role in dispersion of nanofillers in epoxy resin. Most of the supplied probes with the ultrasonic processors have diameters of about 12.5 mm or 25 mm. See O. Asi: Mechanical properties of glass-fiber reinforced epoxy composites filled with $Al_2O_3$ particles, J. Reinforced Plastics and Composites 28 (2009), pp. 2861-2867, incorporated herein in its entirety. Larger sonication probe diameters produce less intensity, but the energy is released over a greater area and accordingly, larger volume can be processed. Therefore, a sonication probe diameter must be considered carefully based on the specific goals of the project.

Sonication in pulsed mode retards the rate of temperature increase in a mixture of epoxy resin and nanoparticles, minimizing unwanted side effects and allowing better temperature control than continuous mode operation. Different pulsing mode intervals were observed by many researchers: 15 s on and 59 s off, 12 s on and 48 s off, 5 s on and 9 s off, 15 s on and 15 s off, and 50 s on and 25 s off. Pulse mode operation with long off periods will help to avoid foaming in samples.

The influence of alumina nanoparticles and MWCNT in monolithic and hybrid forms on the mechanical properties of nanocomposites were investigated by one study. See A. Alva, A. Raja: Dynamic characteristics of epoxy hybrid nanocomposites, Journal of Reinforced Plastics and Composites 30 (2011), pp. 1857-1867, incorporated herein in its entirety. In the study, the MWCNT were mixed with epoxy resin by manual stirring for 20 min. The results showed that the storage moduli (Young's modulus) of the alumina nanocomposites with 0.5 and 1.0 wt % nano-alumina loading, improved by 15.0% and 7.4%, respectively, which are higher than obtained for MWCNT nanocomposites. The authors attributed the lower improvement in the storage moduli of MWCNT nanocomposites to the poor dispersion of MWCNT. Hence, the authors recommended using alternative dispersion techniques such as ultrasonication or a three-roll mixer to minimize the agglomerations of MWCNT in epoxy. Other studies observed that with a loading of 1.5 wt % SiC nanoparticles, an average of 20-30% increase in mechanical properties has been observed. Fatigue tests were also performed under flexural loading, and the performance of the nano-infused system was seen to be superior to that of the neat system (without nanoparticles in epoxy). A quick calculation based on a loading of 1.5 wt % SiC nanoparticles shows that the particle volume fraction in the composite in both cases is around 0.53%. By such low particle volume fraction, it is very difficult to visualize 44% increase in stiffness of the nanoparticle infused system. Observations listed previously indicate an underlying phenomena of interatomic/molecular activities in the polymer taking place in the presence of the nano-sized particles. These particles being very small increase surface energy and subsequently enhance crystallinity and cross-linking of the polymer. This in turn causes improved stiffness and strength of the resulting composites.

Epoxy monomers react with curing agent during curing to form a three-dimensional cross-linked network with certain thermomechanical properties. The degree and uniformity of curing reaction affects the bulk material properties. See R. M. Rodgers, H. Mahfuz, V. K. Rangari, S. Jeelani, L. Carlsson: Tensile response of SiC nanoparticles reinforced epoxy composites at room and elevated temperatures, Proc. of the 16th Int. Conf, Composite Materials, Kyoto Japan (2007), pp. 1-6 48; I. E. Sawi, P. A. Olivier, P. Demont, H. Bougherara: Investigation of the effect of double-walled carbon nanotubes on the curing reaction kinetics and shear flow of an epoxy resin, Journal of Applied Polymer Science 126 (2012), pp. 358-366, each incorporated herein in its entirety. Various degrees of nanofiller concentrations may influence curing reactions to a different degree or sometimes with opposite effect. See J. P. Pascaul R, J. J. Williams: Epoxy Polymers—New Materials and Innovations, Wiley-VCH Verlag, Weinheim, Germany (2010); M. Preghenella, A. Pegoretti, C. Migliaresi: Thermo-mechanical characterization of fumed silica-epoxy nanocomposites, Polymer 46 (2005), pp. 12065-12072 each incorporated herein in its entirety. Studies showed that both unfunctionalized and functionalized MWCNT have an accelerating influence on the reaction kinetics. Zhou et al. also found that the degree of epoxy cure is decreased by the addition of 1 wt % unfunctionalized MWCNT. This result was evidenced by the lower value of the glass transition temperature (Tg) of the cured nanocomposite by 15° C. compared to the neat epoxy. Tao et al. also observed that with only 1 wt % of carbon nanotubes, the Tg of epoxy composites was lowered by approximately 10-30° C.

The weight and fuel savings offered by composite materials make them attractive not only to the military, but also to the civilian aircraft, space, and automobile industries. In these industries, bolted and riveted joints are extensively used as a primary method for structural joining. Bolted joints in composite materials have complex failure modes, and hence the demand for improving their performance exists.

In view of the forgoing, the objective of the present invention is to improve the tensile and compressive strength and strain performance of a stacked composite material prepared with glass fiber and a nanocomposite of epoxy resin, alumina, and silicon carbide nanoparticles.

BRIEF SUMMARY OF THE INVENTION

According to a first aspect, the present disclosure relates to a stacked composite material having at least two glass fiber layers, in which the glass fiber layers share a common axis and glass fibers present in the glass fiber layers are coplanar and parallel, at least three nanocomposite layers comprising a nanofiller dispersed in a cured epoxy matrix, in which the nanofiller is silicon carbide nanoparticles, aluminum oxide nanoparticles, or both, wherein each glass fiber layer is sandwiched between two nanocomposite layers and the nanocomposite layers are formed integrally with the glass fiber layer and adjacent and noncontiguous glass fiber layers are oriented in a unidirectional orientation or a quasi-isotropic orientation with respect to the glass fibers present within each glass fiber layer in the stacked composite material.

In some embodiments, the stacked composite has a wt % of the nanofiller ranging from 0.1 wt. % to 5.0 wt. % relative to the total weight of the epoxy matrix.

In some embodiments of the stacked composite material, the nanofiller is in the form of a nanoparticle with a diameter between 1 nm and 40 nm.

In some embodiments of the stacked composite material, a distance between the glass fibers in each glass fiber layer is between 0.5 mm and 10 mm.

In some embodiments of the stacked composite material, a linear density of the glass fibers is between 0.10 g/m to 5.0 g/m.

In some embodiments of the stacked composite material, a fiber volume fraction is between 20%-50% of the total volume of the stacked composite material.

In some embodiments, the stacked composite material has at least 17 total layers of the glass fiber layer and the nanocomposite layer, in which the nanocomposite layer forms a first layer and a last layer of the stacked composite material.

In some embodiments of the stacked composite material, the adjacent and noncontiguous glass fiber layers are oriented in the quasi-isotropic orientation with respect to the coplanar and parallel glass fibers present within each glass fiber layer, sharing a common axis, and wherein the glass fiber layers have an orientation angle sequence of approximately 0°, approximately 45°, approximately 135°, or approximately 90° within the stacked composite material.

In some embodiments of the stacked composite material, the orientation angle sequence is a palindromic sequence organized by an orientation angle of each glass fiber layer.

In some embodiments of the stacked composite material, the epoxy matrix comprises 50%-90% by weight of at least one epoxy resin, relative to a total weight of the epoxy matrix, and 15%-45% by weight of at least one epoxy hardener relative to the total weight of the epoxy matrix, and wherein the epoxy matrix has a viscosity between 210 centipoise and 410 centipoise in a temperature between −5° C. and 25° C.

In some embodiments of the stacked composite material, the at least one epoxy resin comprises bisphenol A and/or bisphenol F and the at least one epoxy hardener comprises at least one selected from the group consisting of a cycloaliphatic amine, an aliphatic amine, and a thiol.

In some embodiments of the stacked composite material, the nanofiller is silicon carbide nanoparticles, and the stacked composite material has a tensile strength between 100 megapascals to 500 megapascals and a tensile strain between 5 gigapascals to 45 gigapascals.

In some embodiments of the stacked composite material, the nanofiller is silicon carbide nanoparticles, and the stacked composite material has a compressive strength between 120 megapascals to 400 megapascals and compressive strain between 5 gigapascals to 35 gigapascals.

In some embodiments of the stacked composite material, the nanofiller is aluminum oxide nanoparticles, and the stacked composite material has a tensile strength between 150 megapascals to 600 megapascals and a tensile strain between 10 gigapascals to 45 gigapascals.

In some embodiments of the stacked composite material, the nanofiller is aluminum oxide nanoparticles, and the stacked composite material has a compressive strength between 150 megapascals to 350 megapascals and compressive strain between 10 gigapascals to 40 gigapascals.

According to a second aspect, the present disclosure relates to a method of preparing a stacked composite material including applying a nanocomposite layer comprising a nanofiller dispersed in a cured epoxy matrix onto a substrate, wherein the nanofiller is silicon carbide nanoparticles, aluminum oxide nanoparticles, or both, overlaying a glass fiber layer on top of the nanocomposite layer, wherein the glass fiber layer comprises glass fibers which are coplanar and parallel, rolling a roller over the glass fiber layer in a direction parallel to a longitudinal axis of the glass fibers to form integrally with the glass fiber layer and the nanocomposite layer, repeating the applying, overlaying, and rolling, wherein each glass fiber layer is sandwiched between two nanocomposite layers and each glass fiber layer is oriented in a unidirectional orientation or a quasi-isotropic orientation relative to an adjacent and noncontiguous glass fiber layer that shares a common axis, and covering the stacked composite material with a plate and curing to form the stacked composite material.

In some implementation of the method, the stacked composite material comprises at least 17 total layers, in which glass fiber layers are interleaved between nanocomposite layers, and the nanocomposite layer forms a first layer and a last layer of the stacked composite material.

In some implementations of the method, adjacent and noncontiguous glass fiber layers are oriented in the quasi-isotropic orientation with respect to the coplanar and parallel glass fibers present within each glass fiber layer, and wherein the glass fiber layers have an orientation angle sequence of approximately 0°, approximately 45°, approximately 135°, or approximately 90° within the stacked composite material.

In some implementations of the method, the orientation angle sequence is a palindromic sequence organized by an orientation angle of each glass fiber layer sharing a common axis.

In some implementations of the method, the curing comprises applying uniform pressure to the plate for 8 hours to 60 hours, wherein the pressure applied is between 50 kg/m$^2$ and 300 kg/m$^2$, then releasing the pressure and holding for 1 day to 35 days under ambient temperature.

The foregoing paragraphs have been provided by way of general introduction, and are not tended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
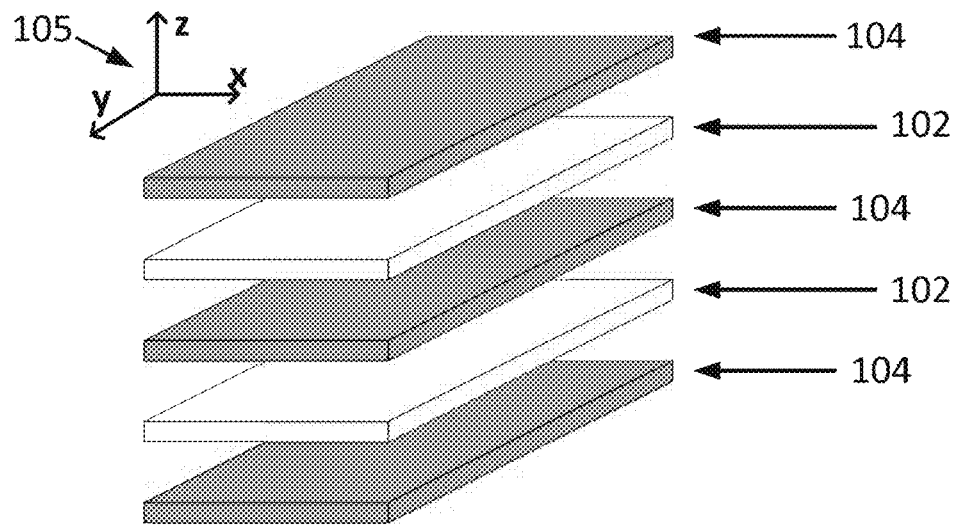
FIG. 1 is an exemplary expanded orthogonal view of the stacked composite material having multiple glass fiber layers 104 sandwiched between nanocomposite layers 102.

Referring now to the drawings, wherein like reference numerals designate identical or corresponding parts throughout the several views.

The present disclosure pertains to a stacked composite material having at least two glass fiber layers and at least three nanocomposite layers. Each glass fiber layer is sandwiched between two nanocomposite layers. A shape of stacked composite material may include, but is not limited to rectangular, cylindrical, or a three dimensional polygon. The stacked composite material may also be in the shape of a sphere. The stacked composite material may be formed as a rectangle and cut into customized shapes.

Figure 2:
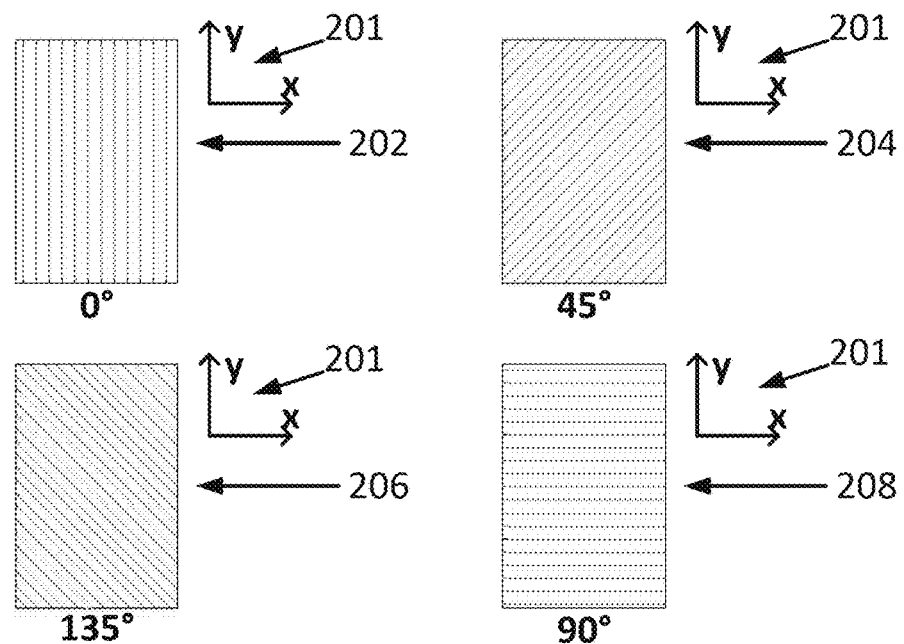
FIG. 2 is an exemplary depiction of orientations of glass fibers within a glass fiber layer.

Within the glass fiber layer there are glass fibers oriented coplanar and parallel. Glass fibers lying in a common plane are defined to be coplanar. Glass fibers or a portion of a length of glass fiber may be in a common plane. Of the total glass fibers in each glass fiber layer, at least 20% may be in a common plane, at least 30% may be in a common plane, at least 40% may be in a common plane, at least 50% may be in a common plane, at least 60% may be in a common plane, at least 70% may be in a common plane, at least 80% may be in a common plane, at least 90% may be in a common plane, or at least 95% may be in a common plane. The glass fibers may form a single row, or alternatively glass fibers may stack on top of each other and still meet the definition of coplanar. A pair of glass fibers may be coplanar and parallel if the pair of glass fibers are within 20° of parallel, within 15° of parallel, within 10° of parallel, within 5° of the parallel, and/or within 1° of parallel. Within each glass fiber layer, of the total number of glass fibers present in the glass fiber layer at least 50% are parallel and coplanar, at least 60% are parallel and coplanar, at least 70% are parallel and coplanar, at least 80% are parallel and coplanar, and at least 90% are parallel and coplanar. In the stacked composite material, there may be multiple glass fiber layers each sandwiched between nanocomposite layers. FIG. 1 depicts an exemplary expanded orthogonal view of the stacked composite material having multiple glass fiber layers 104 sandwiched between nanocomposite layers 102. FIG. 1 includes a coordinate axis 105 to show the directionality of the layers and that each layer shares a common axis. Glass fibers within the glass fiber layer may be oriented at an angle in reference to a longitudinal axis of the layer or along the y-axis as shown by the coordinate axis 105. The angle to which the glass fibers within the glass fiber layer may be oriented are schematically depicted in FIG. 2 at approximately 0° 202, at approximately 45° 204, at approximately 135° 206, or at approximately 90° 208. The angle to which the glass fibers are oriented are depicted with the relative coordinate axis 201. The descriptor "approximately," as used herein may indicate within ±1% of the measurement, within ±5% of the measurement, within ±10% of the measurement, or within ±15% of the measurement. Adjacent and noncontiguous glass fiber layers which are oriented in the same direction are in a unidirectional orientation (FIG. 3A) in the stacked composite material. Adjacent and noncontiguous glass fiber layers which may each be oriented in different directions are in a quasi-isotropic orientation (FIG. 3B) in the stacked composite material.

In some embodiments the glass fiber layer comprises glass fiber roving. The glass fiber roving may include, but are not limited to alkali glass, alkali resistant glass, corrosive resistant glass, low dielectric constant glass, alkali-free and electrically resistive glass, acid-corrosion resistive glass, calcium alumino-silicate glass, magnesium alumino-silicate glass, or combinations thereof.

In some embodiments of the stacked composite materials, the glass fiber layer may also comprise non-glass fibers including, but not limited to graphite fibers, cellulose fibers and aramid fibers. The non-glass fiber content may be no more than 20%, no more than 15%, no more than 10%, or no more than 5% of the total fiber content in a glass fiber layer.

In some embodiments of the stacked composite material, a linear density of the glass fibers is between 0.10 g/m to 5.0 g/m, between 0.50 g/m to 4.5 g/m, between 1.0 g/m to 3.0 g/m, between 1.5 g/m to 2.5 g/m.

In some embodiments of the stacked composite material, a glass fiber volume fraction of the total volume of the stacked composite material is between 20% and 50%, between 25% and 45%, between 30% and 40%.

The nanocomposite layer comprises nanofiller dispersed in an epoxy matrix. The epoxy matrix may be in 50%-90%, 60%-80%, or 65%-75% by weight of at least one epoxy resin, relative to a total weight of the epoxy matrix, and 15%-45%, 20%-40%, or 25%-35% by weight of at least one epoxy hardener relative to the total weight of the epoxy matrix. For example, the epoxy resin may comprise bisphenol A and/or bisphenol F, such as Huntsman Araldite® PY 1092-1 or Emerald Performance Materials EPALLOY® 7192. For example, the epoxy hardener may comprise at least one compound selected from the group consisting of a cycloaliphatic amine, an aliphatic amine, and a thiol, such as Huntsman Araldite® HY 1092 or Bruno Bock THIO-CURE® ETTMP. A ratio of epoxy resin to epoxy hardener may be 1:5, 1:4:1:3:1:2, or 1:1. Some formulations of the epoxy matrix may also include secondary resins, such as novolac epoxy resin, aliphatic epoxy resins, or glycidylamine epoxy resin for temperature resistance exceeding 150° C. and up to 500° C. Some formulations of the epoxy matrix may further include additives such as, but not limited to plasticizers (i.e. Dibutyl adipate, polyisoprene, ethylene-vinyl acetate), anti-degradation agents (i.e. polythiophene, calcium sulfonate, barium sulfonate), diluents, toughening agents, pigments, clay fillers, and combinations-thereof. Of the total weight of the epoxy matrix, the percentage by weight of the secondary resins and additives may be no more than 15%, no more than 10%, or no more than 5%.

The nanofillers in the nanocomposite include at least one of alumina or con carbide nanoparticles. Alumina or aluminium oxide is a chemical compound of aluminium and oxygen with the chemical formula $Al_2O_3$. It is the most commonly occurring of several aluminium oxides, and specifically identified as aluminium(III) oxide. It commonly occurs in its crystalline polymorphic phase $\alpha$-$Al_2O_3$ at room temperature, but can exist as $\gamma$-$Al_2O_3$ as a product of dihydroxylation and at 500° C. and higher. $Al_2O_3$ is significant in its use to produce aluminium metal, as an abrasive owing to its hardness, and as a refractory material owing to its high melting point. Alumina is widely used in a variety of plastics, rubber, ceramics, refractory products for reinforcement toughening, in particular, significantly to improve the ceramic density, finish, and thermal fatigue resistance.

Silicon carbide (SiC) is the only chemical compound of carbon and silicon. SiC was originally produced by a high temperature electro-chemical reaction of sand and carbon. Silicon carbide is an excellent abrasive and has been produced and made into grinding wheels and other abrasive products for over one hundred years. SiC has been developed into a high quality technical grade ceramic with very good mechanical properties. SiC has been used in abrasives, refractories, ceramics, and numerous high-performance applications. Structural and wear applications are constantly developing. SiC nanoparticles exhibit characteristics like high thermal conductivity, high stability, high purity, good wear resistance and a small thermal expansion co-efficient. These particles are also resistant to oxidation at high temperatures.

Both $Al_2O_3$ nanoparticles and SiC may be dispersed in the epoxy matrix. A ratio of $Al_2O_3$ nanoparticle to SiC nanoparticles in the epoxy matrix may be 1:20, 1:15 1:10, 1:9, 1:8, 1:7, 1:6, 1:5, 1:4, 1:3, 1:2, or 1:1.

The nanofillers, SiC and alumina nanoparticles, may be dispersed in the epoxy matrix by methods including but not limited to, mechanical mixing, roller mixing, sonicating, ultrasonic liquid processing, or shaking. Dispersing the nanofillers into the epoxy matrix may be most effectively accomplished when a viscosity of the epoxy is between 210 cP and 410 cP, preferably between 230 cP and 390 cP, more preferably between 250 cP and 370 cP, most preferably between 280 cP and 350 cP, between 300 cP and 330 cP, and between 310 cP and 320 cP. The temperature of the epoxy matrix during dispersion of the nanofiller and preparation of the stacked composite material may be between −5° C. and 25° C., between −2° C. and 15° C., preferably between 0° C. and 10° C. In one embodiment, the nanofillers are dispersed in the epoxy matrix by sonication, followed by manual mixing.

In a preferred embodiment, the nanofiller dispersed in the epoxy matrix is not an allotrope of carbon including, but not limited to carbon nanotubes, graphite particles, $C_{60}$ fullerenes, or amorphous carbon.

In some embodiments, the nanofiller may range from 0.1 wt. % to 5.0 wt. %, 0.3 wt. % to 4.5 wt. %, 0.5 wt. % to 4.0 wt. %, 1.0 wt. % to 3.5 wt. %, 1.5 wt. % to 3.0 wt. %, or 2.0 wt. % to 2.5 wt. % relative to the total weight of the epoxy matrix. In some embodiments, the nanofiller is in the form of a nanoparticle with an outer diameter between 1 nm and 40 nm, between 5 nm and 30 nm, or between 15 not and 20 nm.

In some embodiments, the stacked composite material may have 17 total layers of the glass fiber layer and the nanocomposite layer, or any sum of layers fulfilling the function 2n+1, where n is any positive integer greater than 8. For example, the total layers may be 17, 19, 21, 23, etc. The nanocomposite layer may form a first layer and a last layer of the stacked composite material.

In some embodiments of the stacked composite material, adjacent and noncontiguous glass fiber layers are oriented in a quasi-isotropic orientation with respect to the coplanar and parallel glass fibers present within each glass fiber layer, and wherein the glass fiber layers have an orientation angle sequence of approximately 0°, approximately 45°, approximately 135°, or approximately 90° within the stacked composite material and relative to a common axis.

Figure 4:
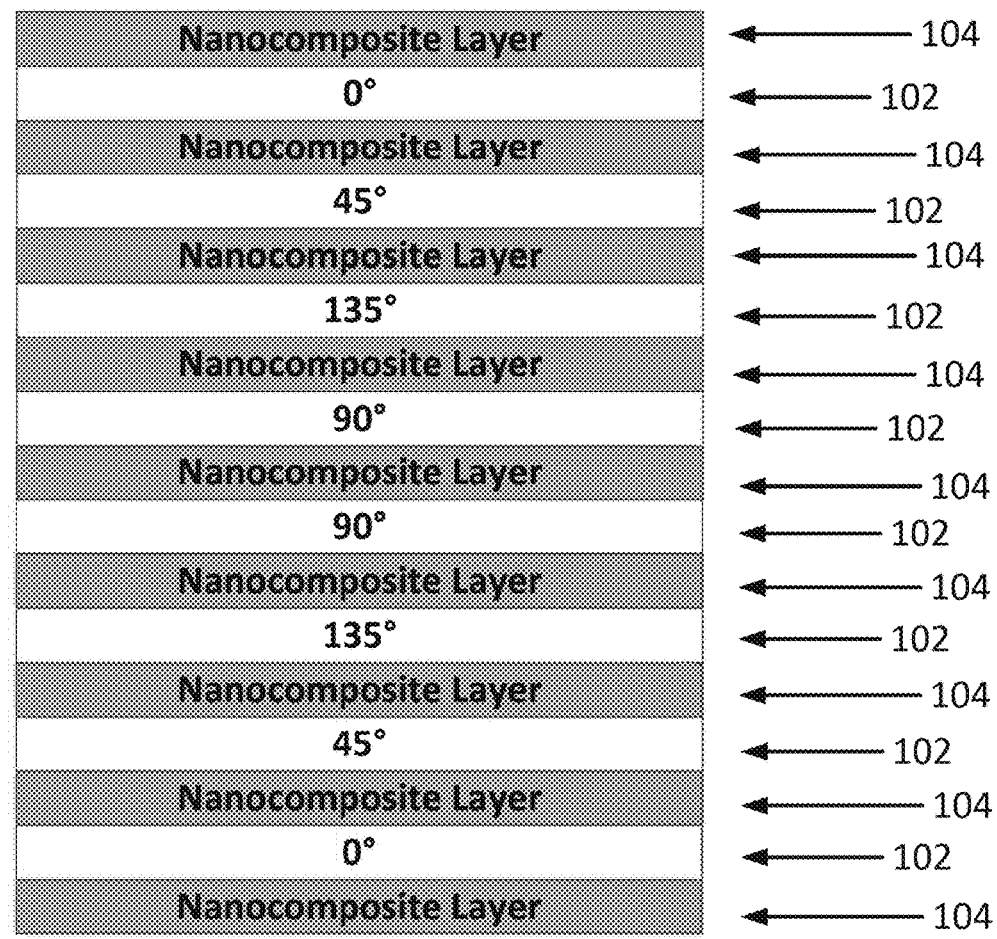
FIG. 4 is a depiction of a schematic example of a 17 layer quasi-isotropic stacked composite material.
Figure 5:
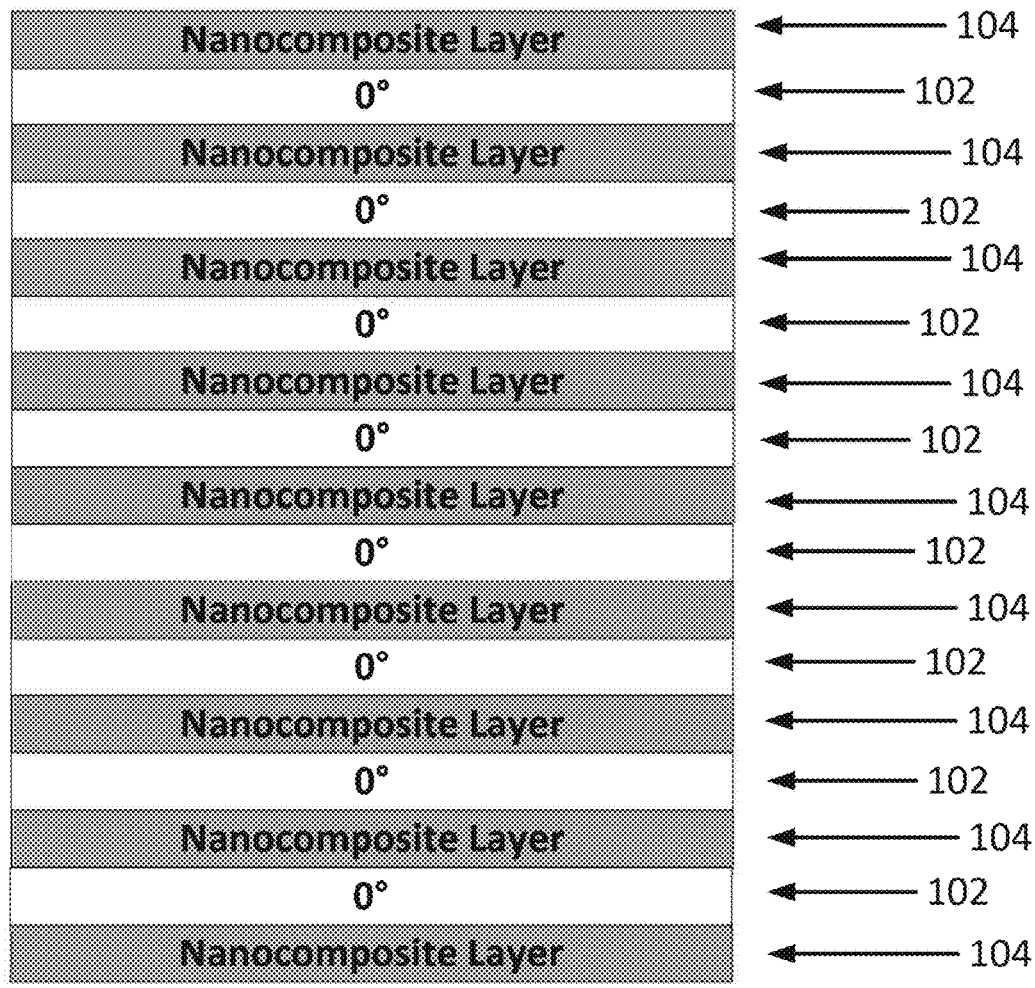
FIG. 5 is a depiction of a schematic example of a 17 layer unidirectional stacked composite material.

In some embodiments of the stacked composite material, the orientation angle sequence is a palindromic sequence organized by an orientation angle of each glass fiber layer. As used herein the term "palindromic sequence" refers to a configuration of the stacked composite, which is substantially symmetrical. Examples of palindromic sequences could have configurations of A/A/A, AB/A, A/B/B/A, A/A/B/B/A/A, A/B/C/B/A, and the like. Examples of non-palindromic layer configurations would include A/B/C, A/B/C/A, A/B/C/D, etc. FIG. 4 and FIG. 5 depicts a schematic example of the 17-layer stacked composite material with the palindromic sequence by the orientation angle. The palindromic sequence of the glass fiber layers between nanocomposite layer may follow the order 0°, 45°, 135°, 90°, 90°, 135°, 45°, and 0°. FIG. 4 depicts a schematic example of a 17-layer quasi-isotropic stacked composite material and FIG. 5 depicts a schematic example of a 17-layer unidirectional stacked composite material.

In some embodiments of the stacked composite material, a distance between the glass fiber layers may be between 0.5 mm and 10 mm, between 1 mm and 7 mm, or between 2 mm and 5 mm. The distance between one glass fiber layer and the adjacent and noncontiguous glass fiber layer may be consistent throughout the stacked composite material or may vary by at most 20%, at most 15%, at most 10%, at most 5%, and/or at most 1%.

In some embodiments, the stacked composite material, in which the nanofiller is silicon carbide nanoparticles, may have a tensile strength between 100 megapascals to 500 megapascals, between 150 megapascals to 450 megapascals, between 200 megapascals to 400 megapascals, or between 250 megapascals to 350 megapascals. The stacked composite material, in which the nanofiller is silicon carbide nanoparticles, may have a tensile strain between 5 gigapascals to 45 gigapascals, between 10 gigapascals to 40 gigapascals, between 15 gigapascals to 35 gigapascals, or between 20 gigapascals to 30 gigapascals.

In some embodiments, the stacked composite material, in which the nanofiller is silicon carbide nanoparticles, may have a compressive strength between 120 megapascals to 400 megapascals, between 180 megapascals to 350 megapascals, or between 250 megapascals to 300 megapascals. The stacked composite material, in which the nanofiller is silicon carbide nanoparticles, may have a compressive strain between 5 gigapascals to 35 gigapascals, between 10 gigapascals to 30 gigapascals, or between 15 gigapascals to 25 gigapascals.

In some embodiments, the stacked composite material, in which the nanofiller is aluminum oxide nanoparticles, may have a tensile strength between 150 megapascals to 600 megapascals, between 200 megapascals to 550 megapascals, between 250 megapascals to 500 megapascals, between 300 megapascals to 450 megapascals, or 350 megapascals to 400 megapascals. The stacked composite material, in which the nanofiller is aluminum oxide nanoparticles, may have a tensile strain between 10 gigapascals to 45 gigapascals, between 15 gigapascals to 40 gigapascals, between 20 gigapascals to 35 gigapascals, or between 25 gigapascals to 30 gigapascals.

In some embodiments, the stacked composite material, in which the nanofiller is aluminum oxide nanoparticles, may have a compressive strength between 150 megapascals to 350 megapascals, between 180 megapascals to 325 megapascals, or between 210 megapascals to 300 megapascals. The stacked composite material, in which the nanofiller is aluminum oxide nanoparticles, may have a compressive strain between 10 gigapascals to 40 gigapascals, between 15 gigapascals to 35 gigapascals, or between 20 gigapascals to 30 gigapascals.

A second aspect of the present disclosure is a method of preparing the stacked composite material described herein. The method includes applying a nanocomposite layer comprising a nanofiller dispersed in a cured epoxy matrix onto a substrate, wherein the nanofiller is silicon carbide nanoparticles, aluminum oxide nanoparticles, or both, in which a first layer of the nanocomposite layer is brushed onto a mold comprising a substrate. The substrate may comprise glass and/or plastic. The method further includes overlaying a glass fiber layer on top of the nanocomposite layer. The glass fiber layer comprises glass fibers which are coplanar and parallel. The glass fibers may be manually positioned in the mold or may be mechanically attached to the mold by clips or staples to the outer frame of the mold as each layer is overlaid. The method further includes rolling a roller over the glass fiber layer in a direction parallel to a longitudinal axis of the glass fibers. The method further includes repeating the applying, overlaying, and rolling to form a stacked composite material, wherein each glass fiber layer is sandwiched between two nanocomposite layers. Each glass fiber layer may be oriented in a unidirectional orientation or a quasi-isotropic orientation relative to an adjacent and non-contiguous glass fiber layer, as described herein. The method further includes applying the nanocomposite layer over the preceding glass fiber layer to form a final layer of the stacked composite material and covering the stacked composite material inside the mold with a plate and curing the stacked composite material.

The applying of the nanocomposite layer may include, but is not limited to brushing, dipping, and spraying. Brushing may be described as spreading a brush coated with the epoxy matrix with nanofiller to apply the nanocomposite layer onto the substrate or a preceding glass fiber layer. Dipping may include immersing an interior portion of the mold into a container retaining a volume of the epoxy matrix with nanofiller. Spraying may be described as using pressurized air to force the epoxy matrix with nanofiller through a nozzle to introduce an evenly distributed nanocomposite layer onto the mold or a preceding glass fiber layer.

In some implementations, the stacked composite material may comprise at least a total of 17 total layers, in which the glass fiber layer are interleaved with nanocomposite layers, and the nanocomposite layer forms a first layer and a last layer of the stacked composite material. As described herein, there may be more than 17 layers in the stacked composite material.

Figure 3B:
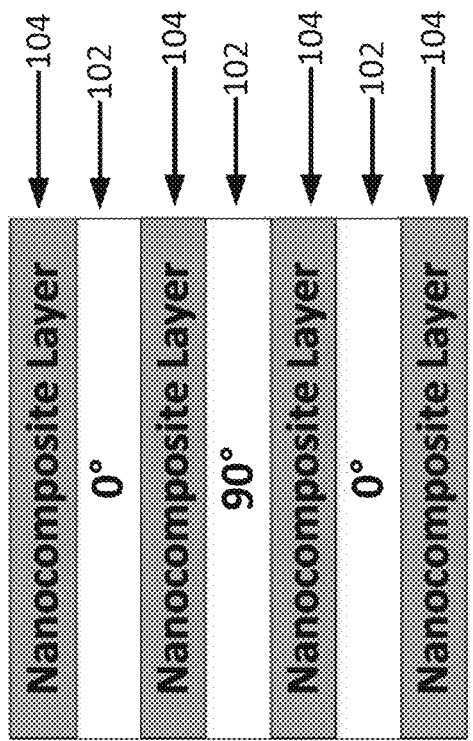
FIG. 3B is an exemplary depiction of adjacent and non-contiguous glass fiber layers which are oriented in different directions and are in a quasi-isotropic orientation in the stacked composite material.
Figure 3A:
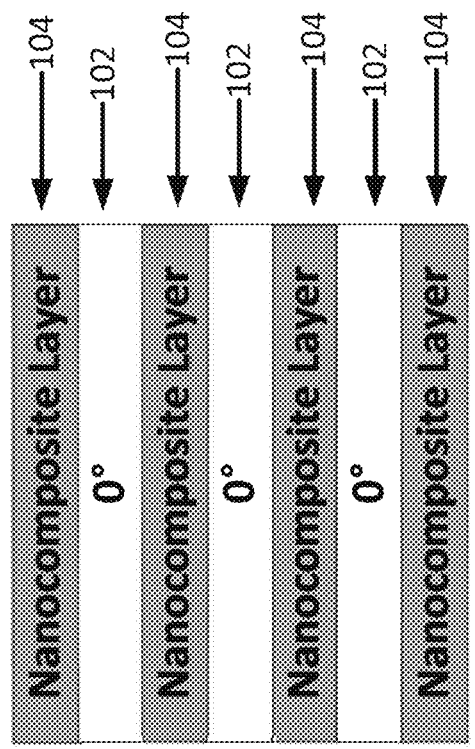
FIG. 3A is an exemplary depiction of adjacent and non-contiguous glass fiber layers which are oriented in the same direction and are in a unidirectional orientation in the stacked composite material.

When more than one glass fiber layers are prepared in the stacked composite material adjacent and noncontiguous glass fiber layers may be oriented in a quasi-isotropic orientation with respect to the coplanar and parallel glass fibers present within each glass fiber layer which share a common axis as depicted in FIG. 3B. The glass fiber layers may have an orientation angle sequence of approximately 0°, approximately 45°, approximately 135°, or approximately 90° within the stacked composite material. The orientation angle of 0° is parallel to the longitudinal axis of the mold. In a non-rectangular mold, an axis may be selected in one layer as a reference axis for all measurements of the orientation angle. In FIG. 4 depicts a schematic example of the 17 layer stacked composite material with the palindromic sequence by the orientation angle, as described herein, as well as a quasi-isotropic orientation of an exemplary stacked composite material. FIG. 5 depicts a schematic example of the 17 layer stacked composite material in the unidirectional orientation.

Figure 6:
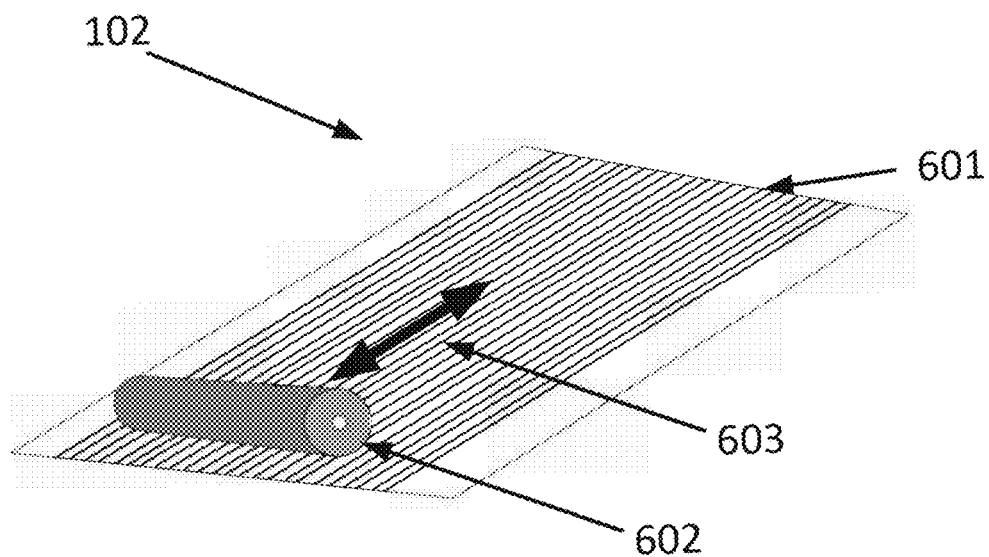
FIG. 6 is a depiction of an exemplary glass fiber layer 120 with exemplary glass fibers 601 and an exemplary aluminum roller 602, which rolls parallel to the longitudinal axis of the glass fibers 603.

After overlaying the glass fiber layer, the method calls for rolling a roller over the glass fiber layer. The roller may be metal, wood, plastic, glass, or a combination thereof. FIG. 6 depicts and exemplary glass fiber layer 102 with exemplary glass fibers 601 and an exemplary roller 602. The rolling may occur in parallel to the longitudinal axis of the glass fibers as depicted in FIG. 6 by the directional arrows 603. An outer face of the roller may be patterned with ridges perpendicular to the longitudinal axis of the roller, ridges parallel to the longitudinal axis of the roller, or both. The roller may be weighted by 0.5 kg-12 kg, by 2 kg-10 kg, or by 4 kg-8 kg.

Rolling the roller over the glass fiber layer may contribute in removing any visible air bubbles in the glass fiber layer and the nanocomposite layer, providing fast impregnation and good wetting of glass fibers with the nanofiller in the epoxy matrix. Accordingly, this improves interfacial bond strength between the glass fiber and epoxy matrix. The interfacial bond strength measures the improvement n the transfer of stress from the epoxy matrix to the glass fibers via the nanofiller. In addition, applying rolling with moderate pressure may de-agglomerate the nanofiller resulting from to the attractive forces between individual nanofiller and the van der Waals interactions.

In some implementations, curing of the stacked composite material comprises applying pressure to the plate for a prolonged period to assure uniform and complete curing. Uniform curing is defined as curing that is consistent over the entire volume of the stacked composite material. For example, the rate of curing in the stacked composite material should proceed at a similar pace at points of equal distance from the center of the stacked composite material. The plate may comprise glass, plastic, or metal and may be coated with a wax or non-adhering coating to prevent adhesion to the nanocomposite material. The pressure applied to the plate is between 50 kg/m$^2$ and 300 kg/m$^2$, 75 kg/m$^2$ and 250 kg/m$^2$, 125 kg/m$^2$ and 175 kg/m$^2$ and the pressure is distributed equally over the plate. With pressure applied the stacked composite material may be cured for 8 hours-60 hours, 16 hours-50 hours, and 20 hours to 40 hours then releasing the pressure and holding the stacked composite material at ambient temperature, the stacked composite material may be continually cured for 1 day to 35 days, 7 days to 30 days, or 14 days to 25 days.

In some implementations, the method of preparing the stacked composite material consists of applying the nanocomposite layer comprising nanofiller, including silicon carbide nanoparticles or aluminum oxide (alumina) nanoparticles, dispersed in the epoxy matrix, in which the first layer of the nanocomposite layer is brushed onto a mold comprising the substrate. The method further consists of overlaying a glass fiber layer on top of the nanocomposite layer. The glass fiber layer consists of glass fibers which are coplanar and parallel. The method further consists of rolling a roller over the glass fiber layer in a direction parallel to a longitudinal axis of the glass fibers. The method further consists of repeating the applying, overlaying, and rolling to form a stacked composite material, wherein each glass fiber layer is sandwiched between two nanocomposite layers. Each glass fiber layer may be oriented in a unidirectional orientation or a quasi-isotropic as described herein and each glass fiber layer shares a common axis. The method further consists of applying the nanocomposite layer over the preceding glass fiber layer to form the final layer of the stacked composite material and covering the stacked composite material inside the mold with the plate and curing the stacked composite material.

The examples below are intended to further illustrate protocols for the preparation and characteristics of the stacked composite materials described above, and are not intended to limit the scope of the claims. The examples are drawn from Aldosari, Saad M., et al. "Design, Manufacture and Analysis of Composite Epoxy Material with Embedded Silicon carbide (SiC) and alumina ($Al_2O_3$) nanoparticles/fibers." Materials Testing 57.1 (2015): 72-84, incorporated herein by reference in its entirety.

Example 1

Materials.

The selected percent of $Al_2O_3$ and SiC nanoparticles is 1.5 wt %, which showed improvement in the mechanical properties by some investigators.

Preparation of Epoxy Matrix

Epoxy part A (100 parts by weight) was mixed with epoxy part B (45 parts by weight) and stirred manually for 10 min. The hardener (epoxy part B) was added gradually (i. e. drop by drop) while the mixture was stirred. After stirring the epoxy resin was poured into glass mold that was treated by a release agent (liquid wax). The mold then pre-cured in an oven for 4 h at 40° C. and post-cured by ramping the temperature from 40° C. to 80° C. and held for 2 h.

Preparation of Nanocomposites

In the present work, two different types of nanocomposites were fabricated including including 1.5 wt % SiC nanocomposites, and 1.5 wt % of $Al_2O_3$ nanocomposites. The different types of nanofillers were dispersed in epoxy resin using a high intensity ultrasonic liquid processor, Cole-Partner Inc., USA.

The dispersion of nanofillers was more difficult in a viscous medium, where the viscosity of polymer increased sharply as the nanofiller loading increased. After sonication, the hardener was added to the epoxy resin and manually stirred for 10 min. Then the nanocomposite epoxy matrix is ready to be poured into the mold and/or over the glass fiber layer.

Fabrication of Quasi-Isotropic [0/45/135/90] Glass Fiber Reinforced Epoxy Stacked Composite Material The quasi-isotropic [0/45/135/90]s glass fiber reinforced stacked composite material was fabricated using hand lay-up technique that was developed for fabricating other types of composite materials. Eight templates were used to lay-up the fiber bundles in 0°, +45°, 135°, 90°, 90°, 135°, +45°, and 0° directions as depicted in FIG. 4. The parallel bundles of fibers were fixed on the frame of the templates. The distance between the adjacent bundles was 5 mm. The upper surface of the mold was a glass plate (600×400 mm) treated by release agent (liquid wax). The first layer of the nanocomposite layer was spread on the mold. The first template with glass fiber in 0° direction was placed on the nanocomposite layer and consolidated using aluminum roller 602 with longitudinally narrow slots parallel to its axis and perpendicular to the fiber directions as shown in FIG. 6. Rolling was continued until the layer was fully impregnated, or consolidated, and all visible air inclusions were removed. This procedure was repeated with alternative layers of the nanocomposite layer and the next glass fiber layers, which were in the following sequence: +45°, 135°, 90°, 90°, 135°, +45°, and 0°. The last layer (nanocomposite) was covered by a Canson paper that was wound on a smooth round aluminum pipe and rolled to remove any visible air bubbles and squeeze the excess resin. To obtain smooth upper surface with nearly constant thickness a glass plate was placed on the Canson paper. In accordance with BS 3496, a weight of 30 kg was distributed on the glass plate. The stacked composite material was pre-cured under uniform pressure for 24 h at room temperature. ISO 1268, and post-cured at room temperature for further 21 days. The margins of the stacked composite material, up to at least 20 mm from the edge, were cut and the working portion of the specimens was taken away from the edge by about 30 mm.

The quasi-isotropic [0/45/135/90] glass fiber reinforced stacked composite material (QI-GFR/SiC/E and QI-GFR/$Al_2O_3$/E) were manufactured by using nanocomposite epoxy resin having nanofillers in the epoxy matrix. Applying rolling using an aluminum roller during the fabrication of stacked composite material played an important role in deagglomeration of the nanofillers and improves the interfacial interaction between the nanocomposite layer and glass fibers. Rolling also contributed to better wetting of glass fibers with the nanocomposite epoxy and removed any visible air bubbles and subsequently, improving the mechanical properties of the stacked composite materials.

Fabrication of Unidirectional Glass Fiber Reinforced Epoxy Stacked Composite Material The stacked composite material with unidirectional glass fiber layers were fabricated by following the same manufacturing procedure of quasi-isotropic stacked composite material using eight layers of unidirectional glass fiber [0°].

The unidirectional organization of the glass fiber layers in the stacked composite material are depicted in FIG. 5.

Glass Fiber Layer Details

The fiber volume fractions ($V_f$) of the manufactured laminates were determined experimentally using the ignition technique according to ASTMD3171. The average value of $V_f$ is 33.7±0.4%. The variation of $V_f$ (±0.4%) was due to the thickness variation during lay-up architecture of hybrid multi-scale composite laminates with different fiber configurations. On the other hand, the variation of $V_f$ in the same laminate did not exceed 0.1%.

Example 2

Mechanical Characterization

The mechanical (tension, compression, and in plane shear) and bolted joint properties of the investigated materials were determined in accordance with a series of ASTMs using computer controlled universal testing machine model CMT5205/5305 MTS SYSTEMS. The mechanical tests were performed at constant cross-head speed of 2 mm/min. The experimental results and the standard deviation are estimated and presented in the results section.

Tension Tests

The test specimens of stacked composite material were prepared and tested in accordance with ASTM standard D 638. The test specimens were cut into strips with dimensions of 165 mm×20 mm width. The strips then machined to the dimensions illustrated in FIG. 7A, FIG. 7B, and FIG. 7C using milling machine.

Figure 7A:
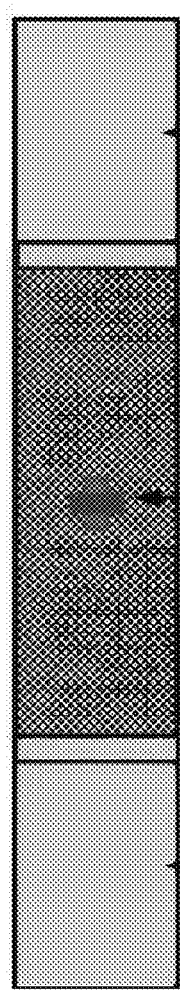
FIG. 7A is a schematic of a view of a test specimen of stacked composite material for tension tests.
Figure 7B:
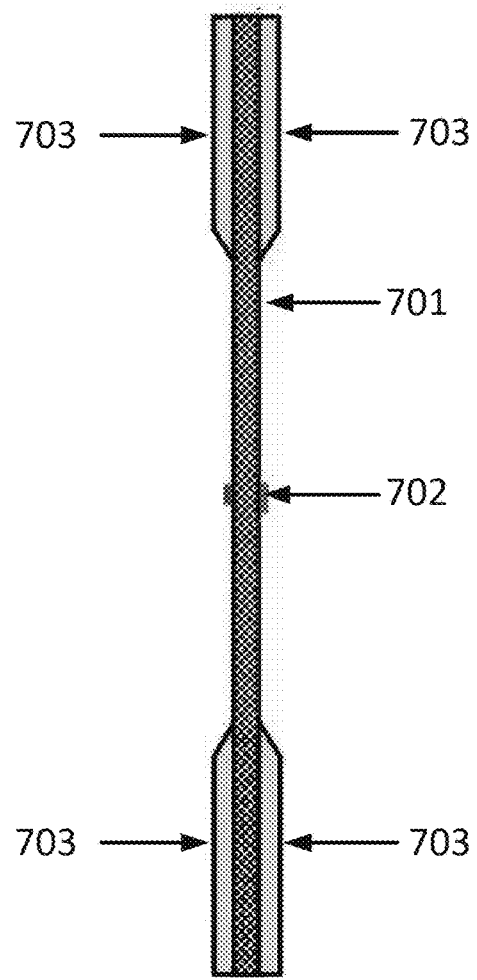
FIG. 7B is a schematic of an alternative view of a test specimen of stacked composite material for tension tests.
Figure 7C:
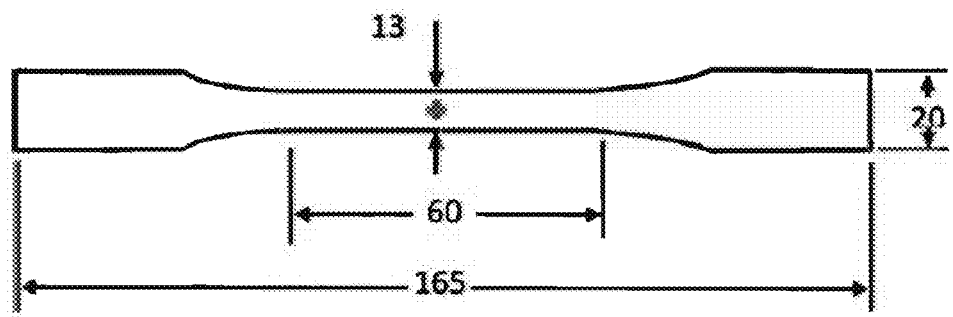
FIG. 7C is a schematic of a view of a test specimen of stacked composite material for tension tests with dimensions in millimeters.

The test specimens 701 of the stacked composite material were prepared and tested in accordance with ASTM standard D3039. The test specimens 701 were cut into strips with dimensions of 250 mm×25 mm (FIG. 7A, FIG. 7B, and FIG. 7C). Four rectangular aluminum end tabs 703 were bonded to the griping length (65 mm) of each test specimen 701 using a cold-hardening epoxy resin. These end tabs 703 not only reduce the stress concentration from the serrated grips but also prevent the slipping of the test specimen 701 from the grip, where the serration of the grip indented the aluminum tabs 703 and engaged it with the specimen 701. End tabs 703 also smoothly transfer the lateral compressive load owing the grips of the testing machine to the specimen 701 and prevent the crushing of the test specimens 701 between the grips. Strain gauges 702 were affixed to the center of the test specimens 701.

Calculation of the Elastic Properties

Figure 8A:
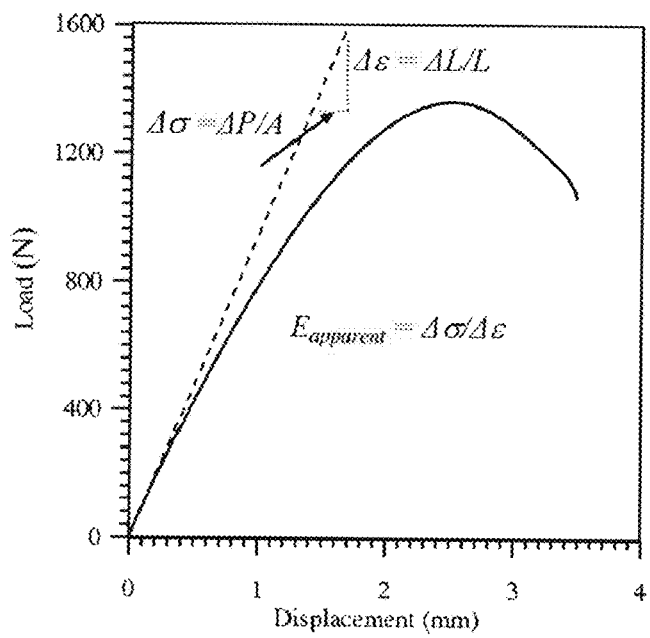
FIG. 8A is a diagram of the load v. displacement of a sample of a stacked composite material.

The apparent modulus was determined from the stress-strain curve of the testing machine as shown in FIG. 8A. The actual strains in the longitudinal and transverse directions were measured using strain gauges 702 connected to 4-channel data acquisition model 9237 NI, which was connected to the computer. Accordingly, two perpendicular strain gages 702 were bonded to the specimen 701 back-to-back to measure the actual Young's modulus, $E_{xx}$, and the major Poisson's ratio $v_{xy}$. At least two specimens for each material type were prepared.

Figure 8B:
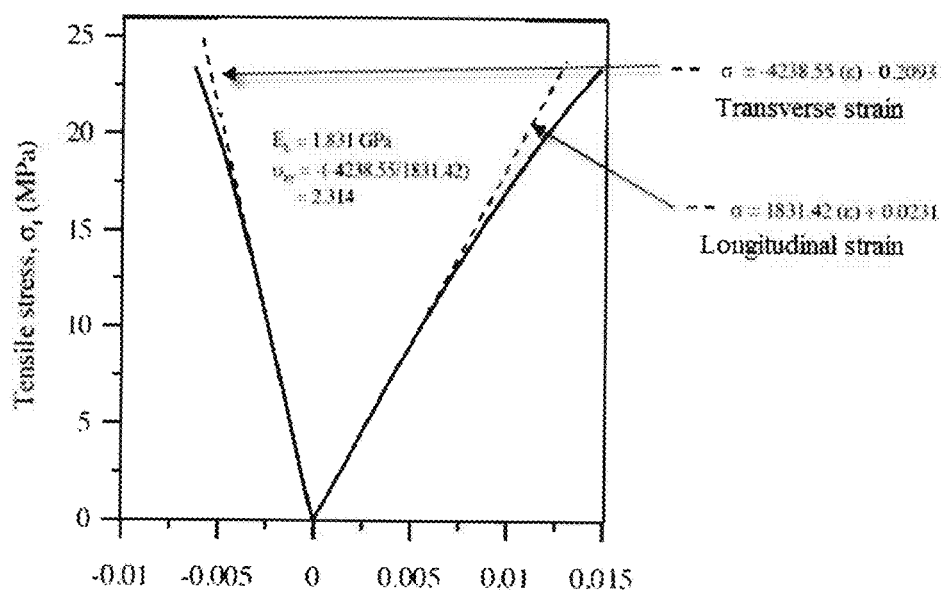
FIG. 8B is a diagram of the tensile stress measurement in transverse strain and longitudinal strain of a sample of a stacked composite material.

FIG. 8B shows the actual stress-strain diagram of neat epoxy as example. From this figure the actual tensile modulus and the major Poisson's ratio ($v_{xy}=\varepsilon_y/\varepsilon_x$) were calculated from the slope of the tangential line to the initial linear portion of the stress-strain diagrams. Previous studies showed that the tensile modulus of cross-ply composite laminate is more than six times the apparent modulus. The result in the previous studies was detected by the testing machine.

Compression Tests

Figure 9B:
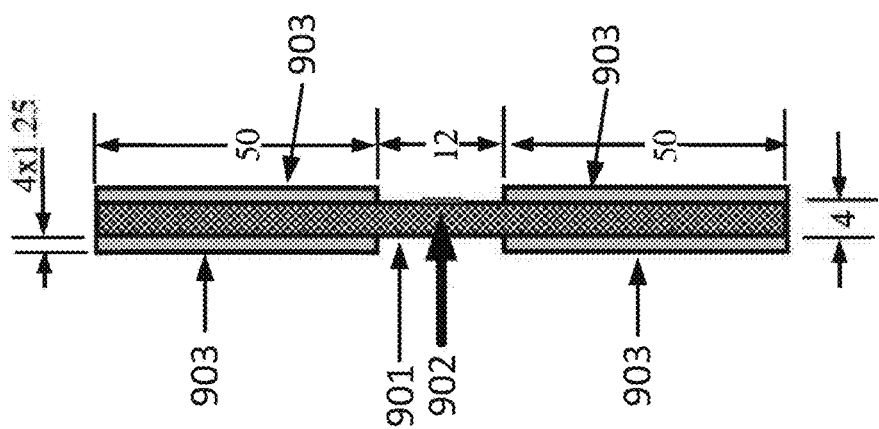
FIG. 9B is a schematic of an alternate view of a test specimen of a stacked composite material for compressive tests.
Figure 9A:
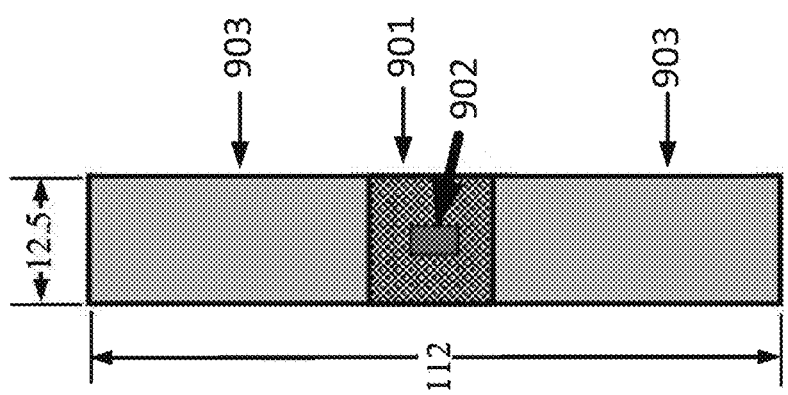
FIG. 9A is a schematic of a view of a test specimen of a stacked composite material for compressive tests.

The stacked composite material test specimens 901 were cut and prepared in accordance with ASTM standard D 3410 as shown in FIG. 9. The Wyoming Modified Celanese Compression Test Fixture was used for this purpose. The fixture presents a design improvement relative to the now withdrawn ASTM Standard D 3410 Celanese Compression Test Fixture. Four rectangular aluminum end tabs 903 were bonded to the griping length (50 mm) of each test specimen 901 using a cold-hardening epoxy resin. These end tabs 903 eliminate stress concentration owing to the serration of the grips and support the specimen 901 over its length to prevent buckling effects. Engagement of the serrations of the grips with the aluminum tabs 903 prevents slipping between them. End-tabs 903 also smoothly transfer the lateral compressive load owing the grips of the test fixture to the specimen 901 and accordingly, preventing the crushing of the test specimens 901 between the grips. The strain gauge 902 was affixed to the center of the test specimen. The apparent as well as the actual compressive moduli were measured in tension test. The actual compressive moduli of the investigated materials were measured using 9237 NI acquisition that was connected with the strain gage 902 and the computer.

Results

The following subsections show the experimental and finite element results regarding the tensile and the compression tests.

Tension

Figures 10A, 10B:
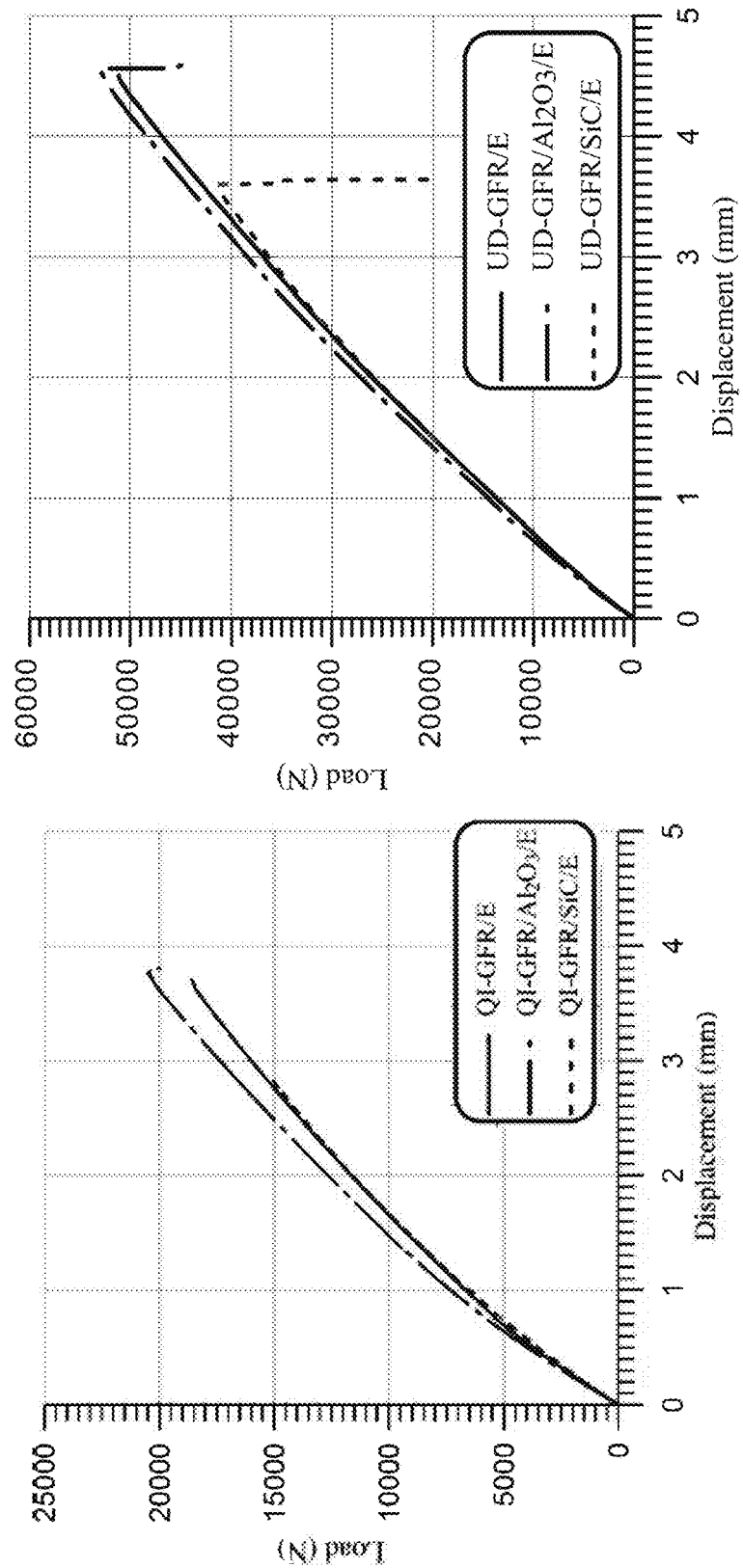
FIG. 10A is a graph of tensile load displacement measurement of a quasi-isotropic stacked composite material with silicon carbide nanoparticles and aluminum oxide nanoparticles as the nanofiller.
FIG. 10B is a table of tensile load displacement diagrams of a unidirectional stacked composite material with silicon carbide nanoparticles or aluminum oxide nanoparticles as the nanofiller.

FIG. 10A represents the load-displacement diagrams of quasi-isotropic glass fiber reinforced composite laminates in tension tests. It is observed from the curve that the ultimate tensile load increase by about 15% for QI-GFR/Al$_2$O$_3$/E (from 18 000 to 20 500 N) and decreased by 17% for QI-GFR/SiC/E compared to QI-GFR/E. The moduli of elasticity for QI-GFR/Al$_2$O$_3$/E also increased due to the slop increase of the QI-GFR/Al$_2$O$_3$/E curve compared to the QI-GFR/E. FIG. 10B shows the load-displacement diagrams of unidirectional glass fiber reinforced composite laminates in tension tests. It is observed from the curve that the ultimate tensile load increased for UD-GFR/Al$_2$O$_3$/E compared to the UDGFR/E. The moduli of elasticity also increased due to the slop increase of the UD-GFR/Al$_2$O$_3$/E curve compared to the UD-GFR/E.

Data in Table 1 and Table 2 indicate that the maximum tensile strength for the unidirectional glass fiber reinforced composite laminates is higher than those obtained from quasi-isotropic glass fiber reinforced composite laminates.

TABLE 1

Tensile properties of stacked composite material of quasi-isotropic and unidirectional stacked composite material with silicon carbide nanoparticles

| Material | Tensile Propertied | | | |
|---|---|---|---|---|
| | $\sigma_t$ [MPa] | Std. dev | $E_t$ [GPa] | $v_{xy}$ |
| SiC/E | 32.7 | 1.159 | 2.505 | 0.395 |
| QI-GFR/SiC/E | 150 | 5.022 | 10.751 | 0.304 |
| LTD-GFR/SiC/E | 405 | 68.414 | 35.744 | 0.323 |

TABLE 2

Tensile properties of stacked composite materials of quasi-isotropic and unidirectional stacked composite material with aluminum oxide nanoparticles

| Material | Tensile Properties | | | |
|---|---|---|---|---|
| | $\sigma_t$ [MPa] | Std. dev | $E_t$ [GPa] | $v_{xy}$ |
| Al$_2$O$_3$/E | 31.73 | 4.456 | 3.444 | 0.392 |
| QI-GFR/Al$_2$O$_3$/E | 210 | 5.150 | 15.537 | 0.296 |
| UD-GFR/Al$_2$O$_3$/E | 520 | 18.179 | 33.044 | 0.326 |

Compression

Figure 11B:
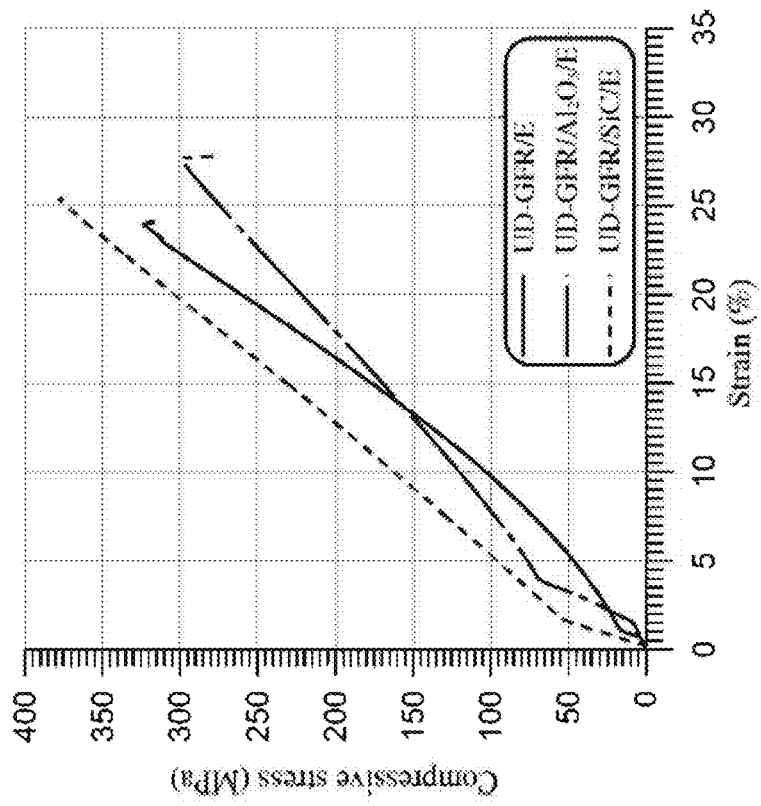
FIG. 11B is a graph of compression stress-strain measurements of unidirectional stacked composite material with silicon carbide nanoparticles or aluminum oxide nanoparticles as nanofiller.
Figure 11A:
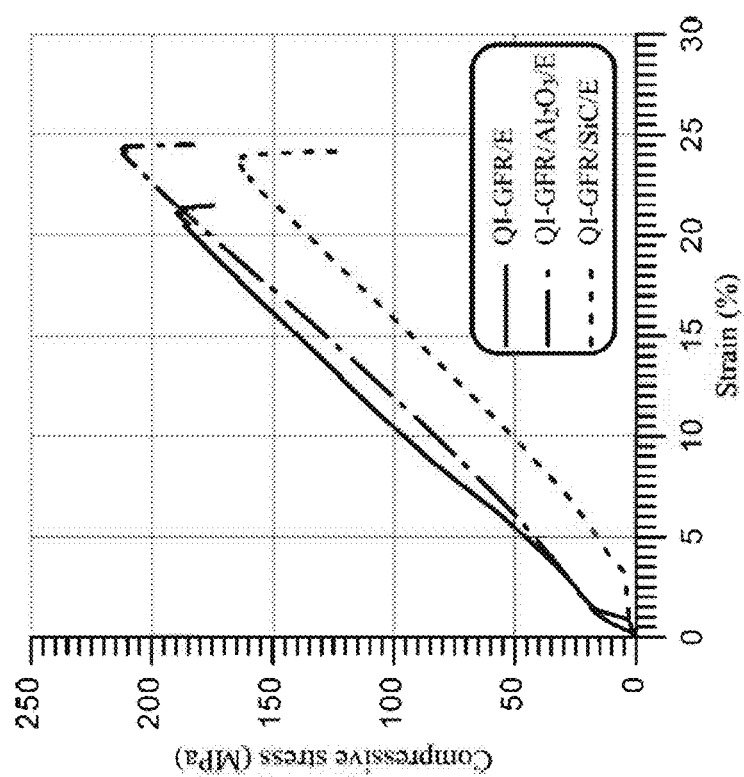
FIG. 11A is a graph of compression stress-strain measurements of quasi-isotropic stacked composite material with silicon carbide nanoparticles or aluminum oxide nanoparticles as nanofiller.

The FIG. 11A and FIG. 11B represent the stress-strain diagrams stress-strain diagrams of unidirectional glass fiber reinforced composite laminates in compression tests, respectively. For QI-GFR/Al$_2$O$_3$/E, the compressive strength increased by 20% compared to QIGFR/E. In addition, the compressive strength decreased by 16% for QI-GFR/SiC/E compared to QI-GFR/E. It has also been observed from data in Table 3 and Table 4 that the moduli of elasticity increased for QI-GFR/Al$_2$O$_3$/E and UDGFR/Al$_2$O$_3$/E compared to the QI-GFR/E and UD-GFR/E, respectively.

TABLE 3

Compression properties of stacked composite material of quasi-isotropic and unidirectional stacked composite material with aluminum oxide nanoparticles

| Material | Compression Properties | | |
|---|---|---|---|
| | $\sigma_c$ [MPa] | Std. dev | $E_t$ [GPa] |
| Al$_2$O$_3$/E | 65 | 1.407 | 3.481 |
| QI-GFR/Al$_2$O$_3$/E | 215 | 15.482 | 16.881 |
| UD-GFR/Al$_2$O$_3$/E | 300 | 46.174 | 32.064 |

TABLE 4

Compression properties of stacked composite materials of quasi-isotropic and unidirectional stacked composite material with silicon carbide nanoparticles

| Material | Compression Properties | | |
|---|---|---|---|
| | $\sigma_c$ [MPa] | Std. dev | $E_t$ [GPa] |
| SiC/E | 63 | 2.297 | 2.562 |
| QI-GFR/SiC/E | 163 | 3.077 | 11.044 |
| UD-GFR/SiC/E | 375 | 14.601 | 26.057 |

The present disclosure shows modification of epoxy resin (Araldite PY 1092-1) by dispersion of different types of nanofillers using a high intensity ultrasonic liquid processor. For the first time, all the sonication parameters are quantitatively well defined. The used nanofillers include silicon carbide (SiC) and alumina (Al2O3) nanoparticles. The nanophased epoxy was used to fabricate different types of nanocomposites as well as nano-hybridized glass fiber reinforced composite laminates. Therefore, nine different advanced materials were fabricated including two nanocomposite materials (SiC/E and Al$_2$O$_3$/E), two quasi-isotropic nano-hybridized composite laminates (QI-GFR/SiC/E and QI-GFR/Al$_2$O$_3$/E), two unidirectional nano-hybridized composite laminates (UDGFR/SiC/E and UD-GFR/Al$_2$O$_3$/E), and three control panels manufactured without nanofillers (neat epoxy, QI-GFR/E, UDGFR/E). The composite laminates were fabricated using the modified hand lay-up technique. The following conclusions can be drawn:

1. Rolling of the composite laminates using special aluminum roller contributes to remove any visible air bubbles, providing fast impregnation and good wetting of glass fibers with the nano-phased matrix and accordingly, improves the fiber/matrix interfacial bond strength. In addition, applying rolling with moderate pressure played an important role in deagglomeration of the alumina nanoparticles owing to the attractive forces between the nanofillers themselves and the van der Waals attractive interactions.
2. Improvements in the tensile and compressive (strength and modulus) of the fabricated nanocomposites (SiC/E and Al$_2$O$_3$/E) compared with neat epoxy can be achieved.
3. The hybridized composite laminate with Al$_2$O$_3$ showed great improvements in their mechanical properties compared to the composite laminates without nanofillers.
4. In contrast, discouraging mechanical properties were observed for SiC hybridized composite laminate.

The invention claimed is:

1. A stacked composite material comprising:
   at least two unidirectional glass fiber layers; and
   at least three nanocomposite layers comprising nanofillers dispersed in a cured epoxy matrix, wherein the nanofillers are spherical aluminum oxide nanoparticles having a diameter between 1 nm and 40 nm;
   wherein each glass fiber layer is sandwiched between two nanocomposite layers and the nanocomposite layers are formed integrally with the glass fiber layer,
   wherein the at least two glass fiber layers are oriented to form thereby either a unidirectional stacked composite material or a quasi-isotropic stacked composite material, and
   wherein a separation distance between any two adjacent glass fiber layers is between 2 mm and 10 mm.

2. The stacked composite material of claim 1, which has a wt % of the nanofillers ranging from 0.1 wt. % to 5.0 wt. % relative to the total weight of the epoxy matrix.

3. The stacked composite material of claim 1, wherein the nanofillers have a diameter between 5 nm and 30 nm.

4. The stacked composite material of claim 1, wherein a linear density of the glass fibers is between 0.10 g/m to 5.0 g/m.

5. The stacked composite material of claim 1, wherein a fiber volume fraction is between 20%-50% of the total volume of the stacked composite material.

6. The stacked composite material of claim 1, which has at least 17 total layers of the glass fiber layer and the nanocomposite layer, wherein the nanocomposite layer forms a first layer and a last layer of the stacked composite material.

7. The stacked composite material of claim 6, wherein the glass fiber layers are oriented thereby producing a quasi-isotropic stacked composite material, and wherein the glass fiber layers have an orientation angle sequence of approximately 0°, approximately 45°, approximately 135°, and approximately 90° within the stacked composite material.

8. The stacked composite material of claim 7, wherein the orientation angle sequence is a palindromic sequence organized by an orientation angle of each glass fiber layer.

9. The stacked composite material of claim 1, wherein the epoxy matrix comprises 50%-90% by weight of at least one epoxy resin, relative to a total weight of the epoxy matrix, and 15% 45% by weight of at least one epoxy hardener relative to the total weight of the epoxy matrix, and wherein the epoxy matrix has a viscosity between 210 centipoise and 410 centipoise in a temperature between −5° C. and 25° C.

10. The stacked composite material of claim 9, wherein the at least one epoxy resin comprises bisphenol A and/or bisphenol F and the at least one epoxy hardener comprises at least one selected from the group consisting of a cycloaliphatic amine, an aliphatic amine, and a thiol.

11. The stacked composite material of claim 1, wherein the stacked composite material has a tensile strength between 150 megapascals to 600 megapascals and a tensile strain between 10 gigapascals to 45 gigapascals.

12. The stacked composite material of claim 1, wherein the stacked composite material has a compressive strength between 150 megapascals to 350 megapascals and compressive strain between 10 gigapascals to 40 gigapascals.

13. The stacked composite material of claim 12, wherein the stacked composite material has a compressive strength between 180 megapascals to 350 megapascals.

14. The stacked composite material of claim 13, wherein the stacked composite material has a tensile stress in a range of 204.85 megapascals to 215.15 megapascals, and a compressive stress in a range of 199.518 megapascals to 230.482 megapascals when the at least two glass fiber layers are oriented thereby producing a quasi-isotropic stacked composite material; or
   the stacked composite material has a tensile stress in a range of 501.821 megapascals to 538.179 megapascals, and a compressive stress in a range of 253.826 megapascals to 346.174 megapascals when the at least two glass fiber layers are oriented in a unidirectional orientation.

15. The stacked composite material of claim 14, wherein the nanofillers consist of aluminum oxide nanoparticles.

16. The stacked composite material of claim 15, which comprises 0.3 wt % to 2.5 wt % of the nanofillers, based on a total weight of the epoxy matrix.

17. The stacked composite material of claim 16, which comprises 1.0 wt % to 2.0 wt % of the nanofillers, based on the total weight of the epoxy matrix.

18. The stacked composite material of claim 3, wherein the nanofillers have a diameter between 15 nm and 20 nm.

19. The stacked composite material of claim 1, wherein a separation distance between any two adjacent glass fiber layers is between 2 mm and 5 mm.

20. The stacked composite material of claim 5, wherein each glass fiber layer comprises a graphite fiber, a cellulose fiber, or an aramid fiber.

\* \* \* \* \*